(12) United States Patent
White et al.

(10) Patent No.: US 7,156,628 B2
(45) Date of Patent: Jan. 2, 2007

(54) WOBBLESTICK WITH HELIX

(75) Inventors: Hollis Newcomb White, Hopkinsville, KY (US); Gerard T. Perkins, Hopkinsville, KY (US)

(73) Assignee: White Drive Products, Inc., Hopkinsville, KY (US)

( * ) Notice: Subject to any disclaimer, the term of this patent is extended or adjusted under 35 U.S.C. 154(b) by 242 days.

(21) Appl. No.: 10/860,434

(22) Filed: Jun. 3, 2004

(65) Prior Publication Data

US 2005/0271536 A1 Dec. 8, 2005

(51) Int. Cl.
*F16D 3/18* (2006.01)
*F01C 1/10* (2006.01)

(52) U.S. Cl. ...................................... 418/61.3; 464/156

(58) Field of Classification Search ............... 418/61.3; 464/156; 409/12
See application file for complete search history.

(56) References Cited

U.S. PATENT DOCUMENTS

| 4,717,320 | A | * | 1/1988 | White, Jr. .................. 418/61.3 |
| 5,195,882 | A | * | 3/1993 | Freeman ..................... 418/171 |
| 5,356,342 | A | * | 10/1994 | White ......................... 464/156 |
| 5,417,528 | A | * | 5/1995 | White ......................... 409/12 |
| 5,911,780 | A | * | 6/1999 | Hamasaka et al. ............. 72/53 |

* cited by examiner

*Primary Examiner*—Hoang Nguyen
(74) *Attorney, Agent, or Firm*—Fay, Sharpe, Fagan, Minnich & McKee, LLP

(57) ABSTRACT

A wobblestick with driving teeth with a helix which is equal to or less than 1° of the running angle of the wobblestick.

17 Claims, 4 Drawing Sheets

WOBBLESTICK WITH HELIX

FIELD TO WHICH THE INVENTION RELATES

This invention relates to the cooperation between a helix and increased diameter root to strengthen the teeth of a wobblestick in a gerotor motor.

BACKGROUND OF THE INVENTION

Gerotor motor pumps are utilized in commercial, industrial, and consumer devices in order to provide reliable high-torque power in a wide variety of applications. These applications include agriculture harvesters, commercial tractors, scissor lifts, lawn mowers, and other applications. Examples of hydraulic motors include: 1) those with a separate orbiting valve including: a) White U.S. Pat. No. 3,452,680 entitled Hydraulic Pump Assembly; b) White U.S. Pat. No. 5,173,043 entitled Reduced Size Hydraulic Motor; and, c) White U.S. Pat. No. 4,877,383 entitled Device Having Sealed Control opening and orbiting Valve; 2) those with a valve integral with the rotor including: a) White U.S. Pat. No. 6,257,853 entitled Hydraulic Motor with Pressure Compensating Plate; and, b) White U.S. Pat. No. 4,717,320 entitled Gerotor Motor Balancing Plate; and, 3) those with a rotating valve including: a) White U.S. Pat. No. 6,074,188 entitled Multiplate Hydraulic Motor Valve.

These devices, while utilizing differing types of valving, all include a wobblestick interconnecting the rotating and orbiting gerotor to the drive shaft. This location is a critical connection for passing the torque drive of the units. Various designs have been developed for the teeth of the wobblestick. An example includes White U.S. Pat. No. 5,356,342 entitled Teeth for a Wobblestick. In this device, the wobblestick has a uniform diameter through out the length of the wobblestick including the root of the teeth for the wobblestick. The wobblestick itself has a sliding tooth contact with both the rotor and drive shaft.

SUMMARY OF THE INVENTION

The invention relates to a wobblestick tooth helix that is equal to or less than the running angle in an offset drive (gerotor motor disclosed).

OBJECTS OF THE INVENTION

It is an object of this invention to lower the wear in wobblestick teeth;

It is an additional objection of this invention to increase the contact area between the wobblestick and the associated parts;

It is another object of this invention to increase the life span of wobblesticks;

It is a further object of this invention to increase the torque carrying diameter of the wobblestick;

It is an yet a further object of this invention to maximize the drive surface between the wobblestick and its associated members;

Other objects of the invention and a more complete understanding of the invention may be had by referring to the drawings within this application in which:

DETAILED DESCRIPTION OF THE INVENTION

This invention relates to a wobblestick 10 for interconnecting two driven members, the rotor, and shaft in a gerotor type device.

The gerotor device itself can have a variety of valving systems as previously set forth in the background of the invention.

Figure 5:
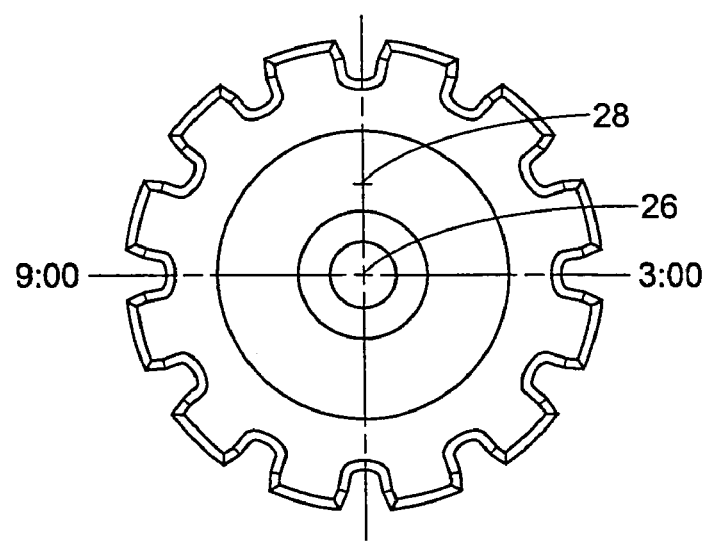
FIG. 5 is an end view of the wobblestick of FIG. 1.

In the preferred embodiment, the wobblestick 10 itself has a tooth helix 53, 63 equal to or less than 1.degree. of the running angle of the wobblestick. This creates single point contacts at the critical 3:00 and 9:00 instantaneous center (FIG. 5). In the embodiment disclosed, the wobblestick has a 0.160" eccentric in its 2.401" length between tooth centers, a 3.80.degree. running angle, and a 3.degree. helix.

The wobblestick 10 has a body 20 and teeth 50.

The body 20 of the wobblestick 10 transfers the torque in the gerotor device between the teeth 50 at opposite ends thereof. Examples of gerotor devices are given in the background of the invention (the contents of which are included by reference).

The body 20 of the wobblestick includes a central section 21 and areas 22, 23 under the root of the later described teeth 50. The body 20 of the wobblestick 10 itself has an outer diameter 25 and a longitudinal axis 26.

Figure 1:
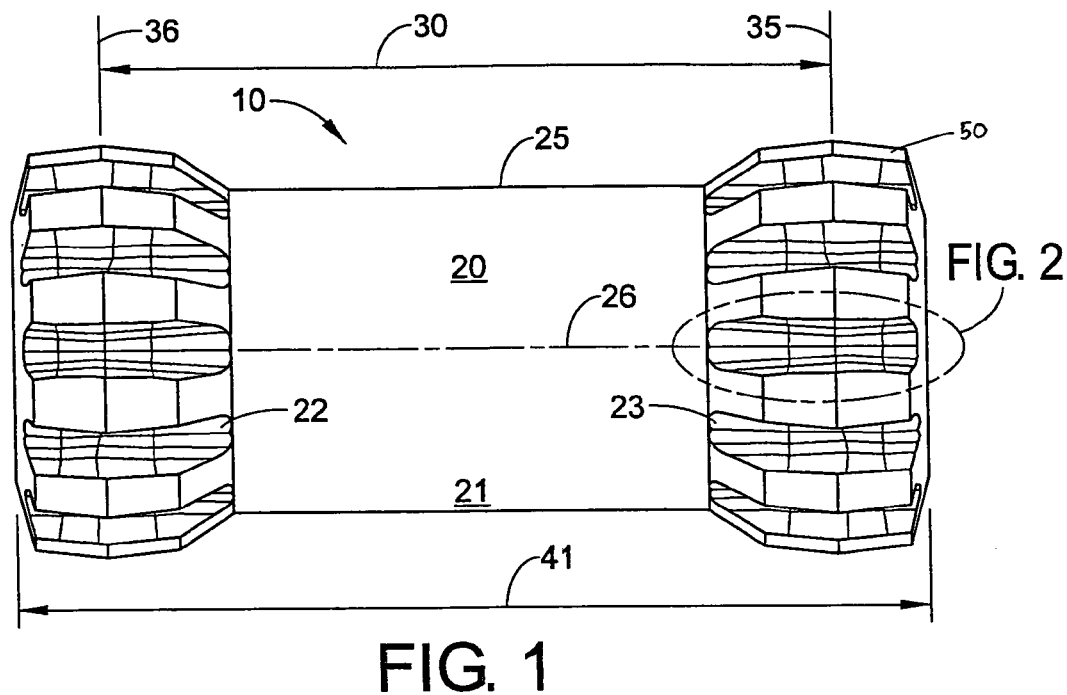
FIG. 1 is a side view of a wobblestick incorporating the invention.
Figure 2:
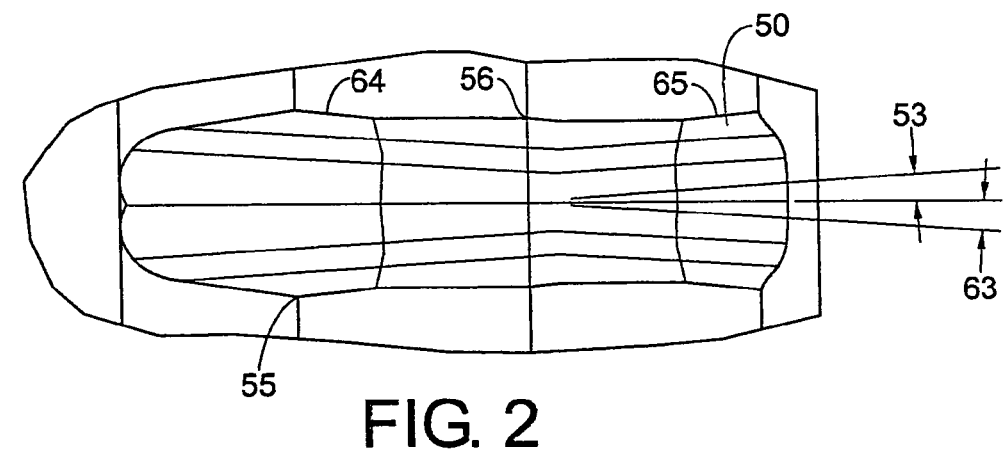
FIG. 2 is an isolated top view of the wobblestick teeth of FIG. 1 taken generally within the oval 2 therein.
Figure 3:
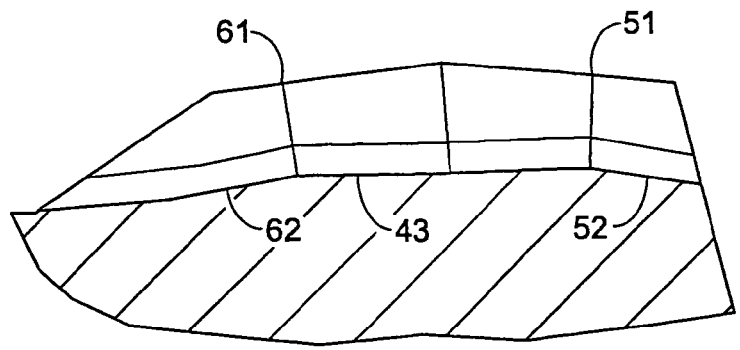
FIG. 3 is a side view of the teeth of FIG. 2.
Figure 4:
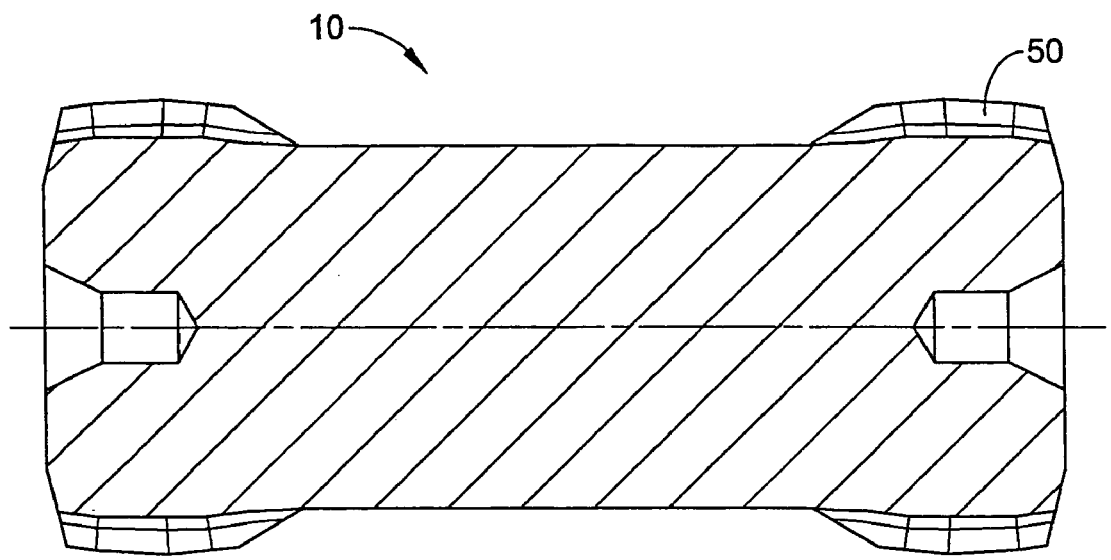
FIG. 4 is a longitudinal cross sectional view through the wobblestick of FIG. 1.
Figure 9:
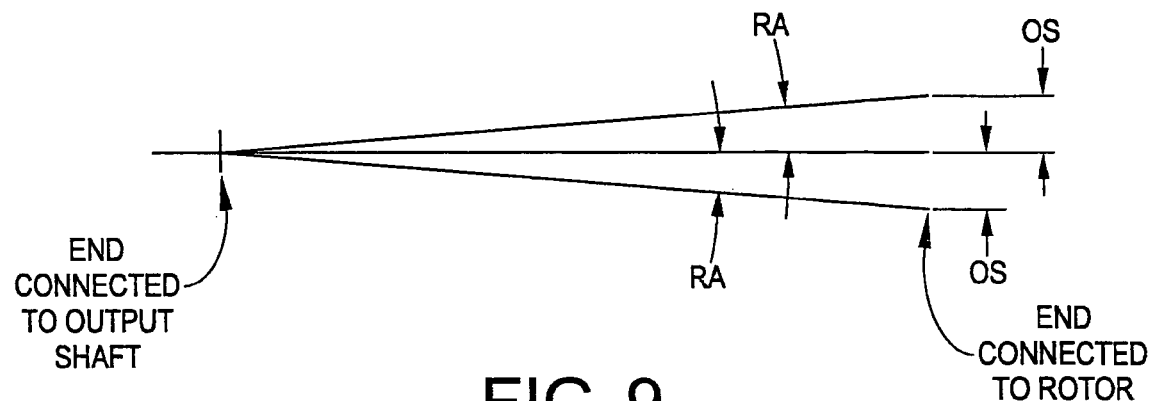
FIG. 9 is a schematic representation of the running angle of the wobblestick.
Figure 10:
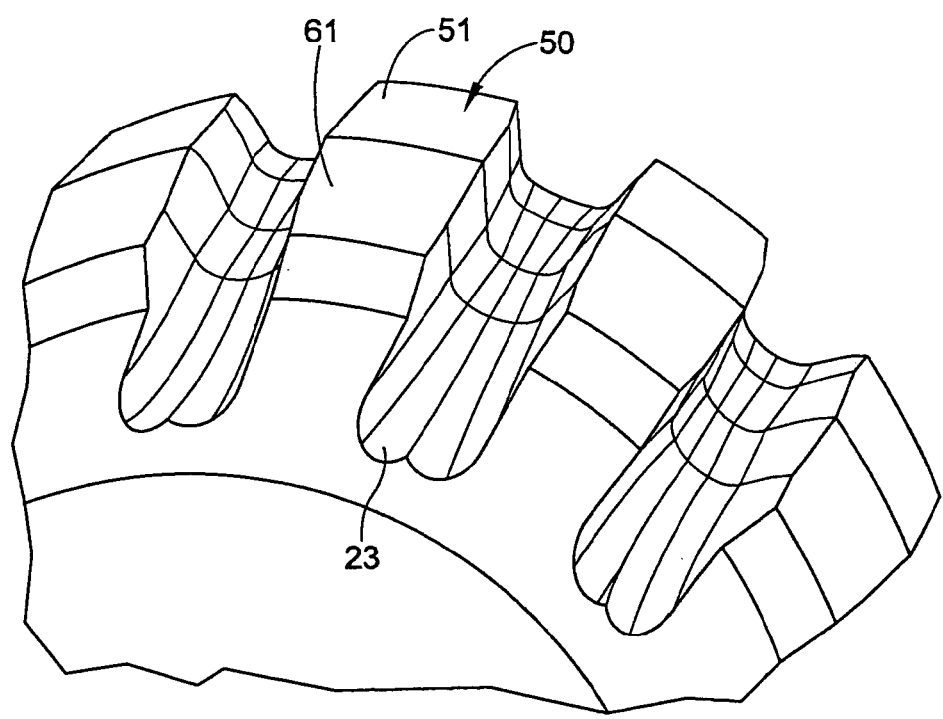
FIG. 10 is a perspective view of an end of the wobblestick of FIG. 1.

The longitudinal axis 26 of the wobblestick 10 runs down the center of the outer diameter of the body 20 of the wobblestick 10 including the areas 22, 23 under the teeth 50 (as later described). As schematically depicted in FIG. 9, in a given application, this longitudinal axis 26 is angled in respect to the two rotational members at either end of the wobblestick (the drive shaft and the rotor in the embodiment disclosed) transcribing an orbit about its length. These orbits themselves define a running angle RA for a given tooth in driving contact. In general, the running angles are equal to each other on either end of the wobblestick 10. The running angles themselves are dependent upon the offset OS of the wobblestick 10 in conjunction with its effective length 30 (FIG. 1), which effective length 30 itself is equal to the distance between the contact planes 35, 36 at either end of the wobblestick 10. (The contact planes 35, 36 themselves are in turn defined herein for any given position at the instantaneous contact that occurs at 3:00 and 9:00 at the tooth centers 56 between the teeth 50 of the wobblestick 10 and the member interconnected therewith (shaft and rotor in the embodiment disclosed). This effective length 30 is less than the total length 41 of the wobblestick 10. However, this length 30 can, with the calculation of hypotenuse over offset, define the running angle for the device. In this application, the running angle is 3.8.degree. (this is calculated by the 2.401" length and the 0.160" offset) for the preferred embodiment.

In the present invention, the helix cut into the leading tooth edges is equal to or less than 1.degree. of the running angle.

In the preferred embodiment of this invention, teeth 50 are formed with a first 53 and a second 63 helix, which helix have a helix angle up to and including being equal to the running angle of the wobblestick. This by itself or in combination with the plunging of the hob at the first flange 61 and a second flange 82 provides the unique tooth profile of the present invention.

The helixes for the wobblestick are preferably 1.degree. or less than the running angles of the wobblestick 10. These helixes of the wobblestick 10 cause point contact towards the center 56 of the teeth (at 9:00 and 3:00) while simultaneously providing a corner support for the critical leading 51 and trailing edges 61 of the teeth 50. Low wear is provided across the length of the tooth. The leading and the trailing edges are not point contacts. Instead the leading and trailing edges have solid teeth areas within the confines for most of the running angles between the wobblestick 10 and its surrounding rotor and shaft. As the wobblestick wears, the contact area will increase due to the sliding contacts between the wobblestick teeth that exists otherwise than at 3:00 and 9:00.

This acts to prevent buttress break out, while providing for the teeth to have a good wear pattern (wearing into a larger contact area). The wobblestick also clears away the center of the tooth 50 because of the low angle described herein.

In the invention of the present application disclosed, the effective length 30 and the contact planes 35, 36 are optimized in consideration of the offset by a unique shaping of the teeth 50 of the wobblestick 10. The length of the device is selected by the designer (2" to 5") as is the offset (0.05 to 0.20). In the embodiment disclosed, the effective length 30 is 2.401" with a 0.160" offset for a total running angle of 3.8.degree. The teeth themselves have a 3.degree. leading helix 53 and a 3.degree. trailing helix 63 (a 3.5.degree. helix for the 2.172" length in FIGS. 6–8). The center 43 of the tooth is higher than both the leading and trailing sides 52, 62 (from 0.015" to 0.04" [0.025" shown]). (Preferably both the center of the teeth and the sides are greater than the diameter of the wobblestick).

This shaping combines to provide instantaneous point contacts at 3:00 and 9:00, while minimizing contact between the corners 55 of the teeth 50 of the wobblestick 10 and the associated devices (shaft and rotor in the embodiment disclosed). Further, this shaping relieves the teeth 50 at their ends by plunging the hob inwards to provide buttresses 64, 65 to displace the contact points inwards of the ends of the teeth (0.015" to 0.040" preferred [0.015" disclosed]).

Figure 6:
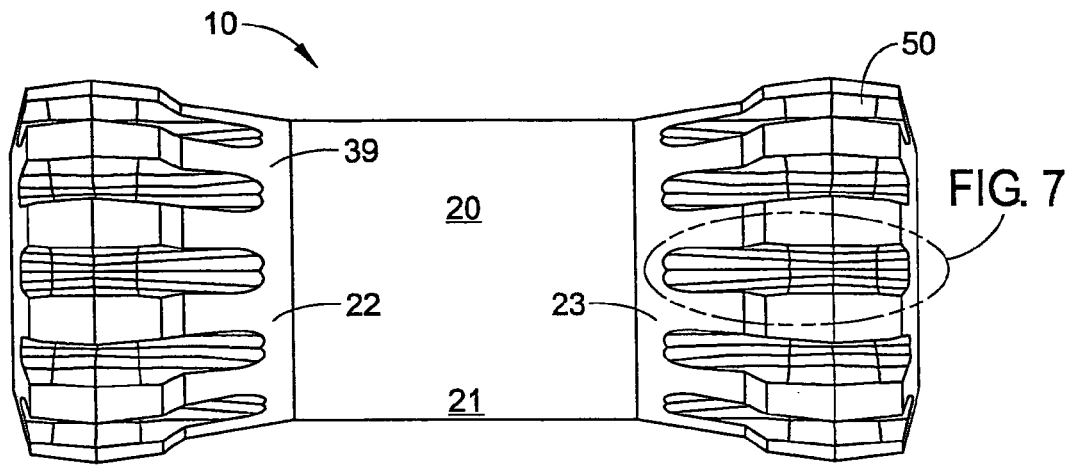
FIG. 6 is a side view like FIG. 1 of an alternate embodiment.
Figure 7:
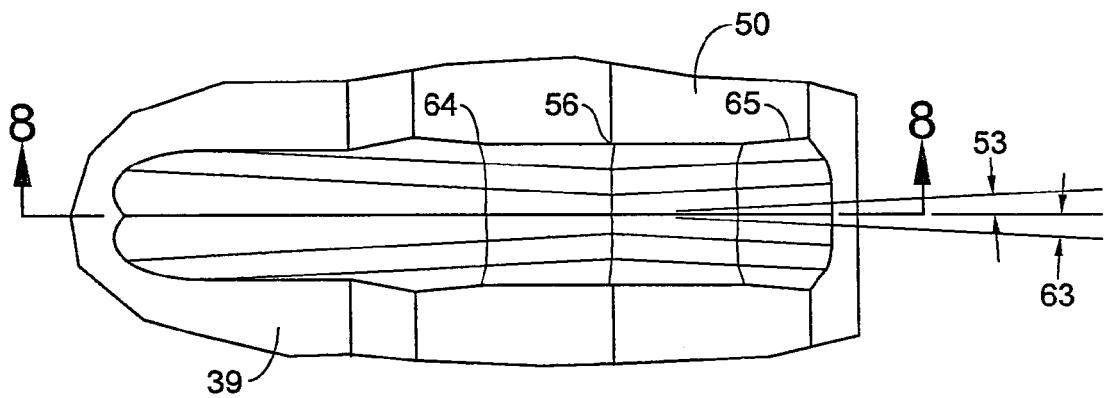
FIG. 7 is an isolated top view of the wobblestick teeth of the alternate embodiment of FIG. 6 taken generally oval 7 therein.
Figure 8:
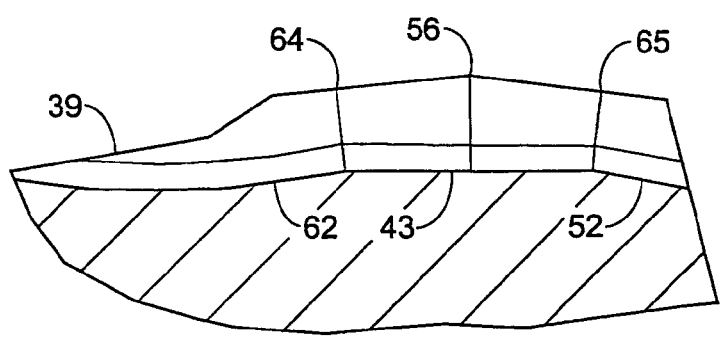
FIG. 8 is a cross sectional view of the alternate embodiment of FIG. 7 taken generally along line 8—8.

A runout 39 at the inner end of the teeth further strengthens the driving interconnection (see FIGS. 6–8). This runout 39 provides additional support of their edge (64 shown) thus spreading out forces thereon into the body 21 of wobblestick 10. It should be used primarily when the device within has a sufficient physical clearance for its inclusion.

The heat treating increases the teeth B 10 to RC 58–62 on the Rockwell Scale. The Shot Peen Process pre-stresses the wobblestick to insure that the teeth 50 of the wobblestick 10 are subject to the treatment. It also increases the hardness an additional step on the Rockwell Scale to insure that all of the wobblestick teeth are subject to the process, the shot is smaller than the width of the root of such teeth. The shot itself is of MI shot with a 6–9A Alman intensity. It is shot to a 200% minimum coverage as verified by the Peenscan Process. This additional step pushes cracks and other deformities into the wobblestick so as to reduce the chipping and splitting during its use in industry or construction equipment, The shot peening process imparts residual compressive stress to the wobblestick to increase strength and fatigue life to the teeth 50 of the wobblestick 10.

Although the invention has been described in its preferred embodiment disclosed, it should be understood that changes, alterations, and modifications may be had without deviating from the present invention as hereinafter claimed.

For example, a hole down the wobblestick will aid in lubrication, heat, as well as washing out particles.

The invention claimed is:

1. In a gerotor pressure device having a housing and a drive shaft,
    a gerotor structure with an orbiting rotor and a wobblestick drivingly connecting the orbiting rotor to the drive shaft, the wobblestick having teeth and a diameter,
    the improvement of the wobblestick having a running angle to at least one of the drive shaft and rotor, the teeth of the wobblestick having a helix, and said helix being less than said running angle.

2. The improvement of claim 1 characterized by the teeth of the wobblestick having a leading edge, a runout, said runout increasing the diameter of the wobblestick at the leading edge of the teeth.

3. The improvement of claim 2 characterized in that the teeth extend into said runout.

4. The improvement of claim 1 characterized in that said helix is within the range of 2° to 5°.

5. The improvement of claim 1 characterized by the wobblestick having a longitudinal axis, the teeth of the wobblestick having a leading edge, and said leading edge being between 30° and 60° of the longitudinal axis of the wobblestick.

6. The improvement of claim 1 characterized by the teeth of the wobblestick having a leading edge with a length and a minor diameter of the teeth at a root of the teeth reducing to be substantially equal to the diameter of the wobblestick within said length of said leading edge.

7. A method of making a wobblestick, the wobblestick connecting a drive shaft and a rotor in a hydraulic device creating a running angle with respect to at least one of the rotor and the drive shaft, the method comprising forming teeth on the wobblestick with a tooth helix angle less than the running angle.

8. The method of claim 7, further comprising forming a root of each tooth higher in the center portion of each tooth.

9. The method of claim 7, further comprising subjecting the teeth of the wobblestick heat treatment to a HC 56–62 hardness.

10. The method of claim 7, further comprising subjecting the teeth of the wobblestick to a shot peen process.

11. The method of claim 7, wherein the step of forming the teeth further comprises forming the teeth with a tooth helix angle that is within one degree of the running angle.

12. A wobblestick for a hydraulic device having an orbiting rotor and a drive shaft, the wobblestick connecting the rotor and the drive shaft and defining a running angle as the rotor orbits, the wobblestick including teeth each having a helix ang le being less than the running angle.

13. The wobblestick of claim 12, wherein the teeth include a central portion having a width measured generally perpendicular to a longitudinal axis of the wobblestick, the width of the central portion being less than a width of an end portion of the teeth.

14. The wobblestick of claim 12, wherein the wobblestick includes a first set of teeth disposed at a first end, a second set of teeth disposed at a second end and a central outer diameter axially disposed between the first set of teeth and the second set of teeth, the wobblestick also having a minor diameter adjacent a root of each tooth that is greater than the central outer diameter.

15. The wobblestick of claim 12, wherein said helix is within the range of 2° to 5°.

16. The wobblestick of claim 12, further comprising a longitudinal axis, the teeth of the wobblestick having a leading edge, and said leading edge being between 30° and 60° of the longitudinal axis of the wobblestick.

17. The wobblestick of claim 14, wherein the teeth of the wobblestick having a leading edge with a length and said minor diameter reducing to be substantially equal to the central outer diameter of the wobblestick within said length of said leading edge.

* * * * *